(12) United States Patent
Wang

(10) Patent No.: US 8,977,045 B2
(45) Date of Patent: Mar. 10, 2015

(54) RECOGNITION METHOD AND SYSTEM FOR COMPONENT IMAGES

(75) Inventor: Jing-Wein Wang, Kaohsiung (TW)

(73) Assignee: National Kaohsiung University of Applied Sciences, Kaohsiung (TW)

( * ) Notice: Subject to any disclaimer, the term of this patent is extended or adjusted under 35 U.S.C. 154(b) by 123 days.

(21) Appl. No.: 13/549,424

(22) Filed: Jul. 14, 2012

(65) Prior Publication Data

US 2013/0216129 A1 Aug. 22, 2013

(51) Int. Cl.
*G06K 9/00* (2006.01)

(52) U.S. Cl.
USPC ............................ 382/165; 382/145; 382/149

(58) Field of Classification Search
None
See application file for complete search history.

(56) References Cited

U.S. PATENT DOCUMENTS

| | | | |
|---|---|---|---|
| 6,285,782 B1 | 9/2001 | Inoue et al. | |
| 6,683,974 B1 * | 1/2004 | Nagasawa et al. | 382/141 |
| 7,355,692 B2 | 4/2008 | Noy et al. | |
| 2004/0197012 A1 * | 10/2004 | Bourg et al. | 382/110 |
| 2005/0117045 A1 * | 6/2005 | Abdellatif et al. | 348/335 |
| 2007/0132759 A1 * | 6/2007 | Mallick et al. | 345/426 |
| 2007/0182955 A1 * | 8/2007 | Tomita et al. | 356/237.1 |
| 2008/0152247 A1 * | 6/2008 | Oh et al. | 382/260 |
| 2008/0285840 A1 * | 11/2008 | Kawai | 382/141 |
| 2010/0067030 A1 * | 3/2010 | Imai et al. | 358/1.9 |
| 2010/0329535 A1 * | 12/2010 | Macenko et al. | 382/133 |
| 2011/0292257 A1 * | 12/2011 | Hatakeyama | 348/242 |
| 2012/0141027 A1 * | 6/2012 | Hatakeyama et al. | 382/167 |
| 2013/0129188 A1 * | 5/2013 | Zhang et al. | 382/144 |

* cited by examiner

*Primary Examiner* — Vu Le
*Assistant Examiner* — Samah Beg
(74) *Attorney, Agent, or Firm* — Alan D. Kamrath; Kamrath IP Lawfirm, P.A.

(57) ABSTRACT

A recognition method includes: retrieving a component image from an image source; utilizing SVD (singular value decomposition) to decompose the component image; and utilizing the decomposed component image for image recognition. In an embodiment, the recognition method further includes: utilizing a light compensation method to calculate at least one light compensation coefficient; utilizing the light compensation coefficient to process the component image to obtain a light-compensated component image; and utilizing the light-compensated component image for image recognition.

18 Claims, 2 Drawing Sheets

RECOGNITION METHOD AND SYSTEM FOR COMPONENT IMAGES

BACKGROUND OF THE INVENTION

1. Field of the Invention

The present invention relates to a recognition method and system for component images. More particularly, the present invention relates to an automatic recognition method and system for component images (e.g. electronic device images) utilizing a singular value decomposition (SVD) method.

2. Description of the Related Art

U.S. Pat. No. 7,355,692, entitled "System and Method for Inspecting Electrical Circuits Utiliing Reflective and Fluorescent Imagery," discloses: a method for inspecting an electrical circuit including optically inspecting at least a portion of an electrical circuit by detecting light reflected therefrom in a first image during a first time interval, optically inspecting light emitted from at least a portion of the electrical circuit by fluorescence in a second image acquired during a second time interval and indicating defects in the electrical circuit based on geometrically coincident indications from both the optically inspecting at least a portion of an electrical circuit by detecting light reflected therefrom and the optically inspecting light emitted from at least a portion of the electrical circuit by fluorescence.

Another U.S. Pat. No. 6,285,782, entitled "Mounting Apparatus, Recognition Device and Recognition Method for Electronic Component," discloses: an electronic component mounting apparatus, an electronic component recognition device and an electronic component recognition method which enable accurate recognition for correcting deviations in alignment of an electronic component in relation to its mounting position. An electronic component being held by a mounting head is illuminated, and a camera visually recognizes the electronic component. A light reflector disposed on a bottom face of the mounting head has a reflector for totally reflecting light, an illuminating body disposed on the reflector which illuminates by absorbing light from a first light source, and a selectively transmitting body disposed on the illuminating body which transmits light from the first light source and absorbs light from a second light source. This configuration causes the light entering the camera from the light reflector to be even. Two lighting methods, i.e. transillumination and illumination provided by reflection, are selectively used by switching the first and second light sources to select the kind of light.

However, there is a need of improving the method for inspecting electrical circuits disclosed in U.S. Pat. No. 7,355,692 and the recognition method for electronic components disclosed in U.S. Pat. No. 6,285,782. The above-mentioned patent publications are incorporated herein by reference for purposes including, but not limited to, indicating the background of the present invention and illustrating the state of the art.

As is described in greater detail below, the present invention provides a recognition method and system for component images. A singular value decomposition method is utilized to provide an automatic recognition method for component images for enhancing the efficiency of recognition in such a way to mitigate and overcome the above problem.

SUMMARY OF THE INVENTION

The primary objective of this invention is to provide a recognition method and system for component images. A singular value decomposition method is utilized to decompose a component image to recognize components therein. Accordingly, the recognition method is successful in enhancing the efficiency of recognition.

Another objective of this invention is to provide a recognition method and system for component images. When a singular value decomposition method is utilized to decompose a component image, at least one light compensation coefficient is further utilized to process the component image for enhancing the accuracy and efficiency of recognition. Accordingly, the recognition method is successful in enhancing the accuracy and efficiency of recognition.

The recognition method for component images in accordance with an aspect of the present invention includes:

retrieving at least one component image from an image source;

utilizing a singular value decomposition method to process the component image; and recognizing at least one component from the decomposed component image.

The recognition system for component images in accordance with an aspect of the present invention includes:

an input unit arranged to retrieve at least one component image from an image source;

a computing unit connected to the input unit, with the computing unit provided with a function of singular value decomposition for processing the component image to obtain at least one decomposed component image; and an output unit connected to the computing unit for providing the decomposed component image;

with at least one component recognized from the decomposed component image.

In a separate aspect of the present invention, a light compensation method is utilized to calculate at least one light compensation coefficient utilized to process the component image, to thereby obtain a light-compensated component image.

In a further separate aspect of the present invention, the component image is decomposed in a color space.

In yet a further separate aspect of the present invention, the color space includes a plurality of color channels on each of which the component image is processed by the singular value decomposition.

In yet a further separate aspect of the present invention, the color space is selected from a RGB color space which includes a red channel, a green channel and a blue channel on each of which the component image is processed by the singular value decomposition.

In yet a further separate aspect of the present invention, when the component image is decomposed in the RGB color space, at least one or two of the light compensation coefficients for the red channel, the green channel and the blue channel are calculated.

Further scope of the applicability of the present invention will become apparent from the detailed description given hereinafter. However, it should be understood that the detailed description and specific examples, while indicating preferred embodiments of the invention, are given by way of illustration only, since various modifications will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

It is noted that a recognition method and system for component images in accordance with the preferred embodiment of the present invention can be applicable to recognizing or inspecting component images of various electronic or non-electronic devices and related products, for example: semi-finished products, finished products or related products consisting of electronic components. Furthermore, the recognition method and system for component images in accordance with the preferred embodiment of the present invention is suitable for executing a recognition procedure on an automatically assembling line, which is not limitative of the present invention.

Figure 1:
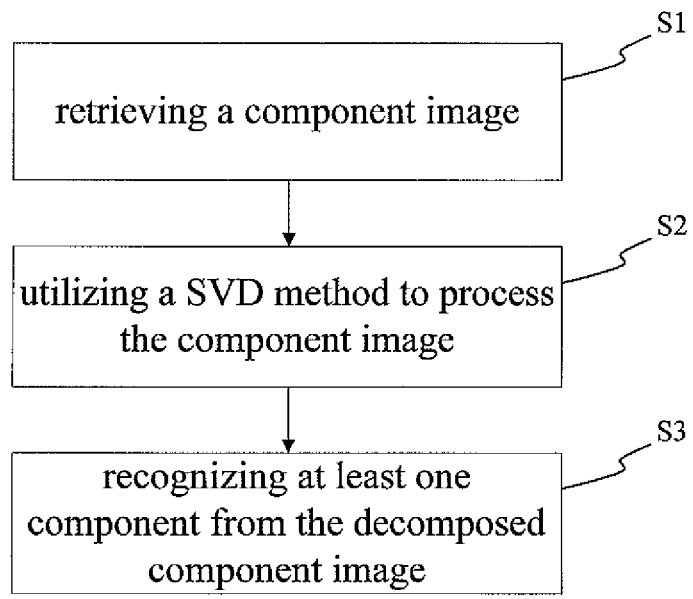
FIG. 1 is a block diagram of a recognition method for component images in accordance with a preferred embodiment of the present invention.

FIG. 1 shows a block diagram of a recognition method for component images in accordance with a preferred embodiment of the present invention. Referring to FIG. 1, the recognition method for component images of the preferred embodiment of the present invention includes: the first step S1, retrieving at least one component image (i.e. image of the interior of electronic device) from an image source. The image source may be selected from an image-capturing device, an image storage unit or the like.

Still referring to FIG. 1, the recognition method for component images of the preferred embodiment of the present invention includes: the second step S2, utilizing a singular value decomposition (SVD) method to process the component image by at least one computing unit (e.g. computer device) or the like. The decomposed component image is generated for recognition in the following step by a suitable manner.

Still referring to FIG. 1, the recognition method for component images of the preferred embodiment of the present invention includes: the third step S3, recognizing at least one component from the decomposed component image to identify the correctness of existence of the component at a predetermined position of the component image. At least one recognition result (i.e. pass or fail) will be given out according to the recognition of the component image.

By way of example, in order to accurately recognize component deficiencies of the unqualified product, the recognition method and system for component images of the present invention provides an adaptation light variation inspecting manner which utilizes a color space transformation technology also called self-adaptation color space transformation (SACST), including two major parts: adaptation light compensation and color space transformation.

The SACST method utilized in the present invention is applied to execute calculation on each color channel of the RGB color space and the color channel possessing a maximum of average color distribution shall be a standard channel to calculate ratios of the other two color channels. According to the ratios of the other two color channels, indexes of the light compensation coefficients for the other two color channels are adjusted so that the color channels of the RGB color space have a dynamic range which is adaptively adjustable.

Figure 2:
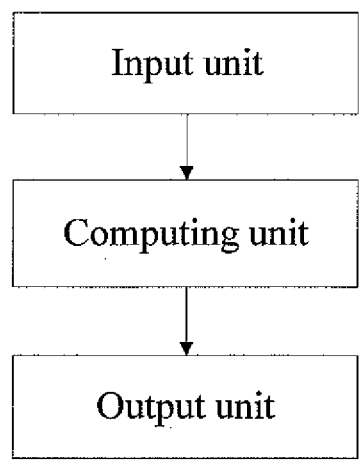
FIG. 2 is a block diagram of a recognition system for component images in accordance with a preferred embodiment of the present invention.

FIG. 2 shows a block diagram of a recognition system for component images in accordance with a preferred embodiment of the present invention. Referring to FIG. 2, the recognition system for component images of the preferred embodiment of the present invention includes an input unit, a computing unit and an output unit. The input unit connects with the computing unit and the computing unit connects with the output unit. The recognition method for component images of the present invention will be executed on the input unit (image input unit) which may be selected from various camera devices, image-capturing devices, image storage devices or other equivalent image-accessing devices. The input unit is arranged to automatically retrieve at least one component image (e.g. electronic component image) from an image source.

The recognition method of the present invention will be further executed on the computing unit which may be selected from various computing devices or other equivalent data-computing devices. The SVD method is applied to process at least one part of the component image to obtain at least one decomposed component image. In a preferred embodiment, at least one light compensation coefficient is further calculated by the light compensation method, and the component image is further processed by the light compensation coefficient to obtain a light-compensated image.

The recognition system of the present invention is operated to retrieve an image A consisting of three color spaces of RGB, which is not limitative of the present invention. The image A is an m×n image, $$A \in \{R,G,B\},$$

wherein $\{R,G,B\}$ is a RGB color space, R is a red color channel, G is a green color channel, and B is a blue color channel.

The recognition method of the present invention utilizes the SVD method to decompose the image A to obtain a decomposed component image which has a SVD matrix, $$\Xi_A = U_A \Sigma_A V_A^T,$$

wherein $\Sigma_A$ is a diagonal matrix, and $U_A$ and $V_A$ are orthogonal matrixes.

The recognition method in accordance with another preferred embodiment of the present invention utilizes a light compensation method to calculate a light compensation coefficient which is utilized to process the component image to obtain a light-compensated image. Consequently, the light-compensated image is applied to process the recognition procedure of the image A.

The recognition method of the present invention is executed to calculate each average of the RGB color channels of the image A (uncompensated image), thereby adaptively adjusting each of the light compensation coefficients. The purpose of calculating each average of the RGB color channels is to search each ratio between differences of RGB pixel values of the original image A. The differences of RGB pixel values are further added to restore the loss information due to decomposition and light compensation to the light-compensated image.

The recognition method of the present invention is executed to calculate the light compensation coefficients by average noise values μ (0.5) and noise value variances σ (1.0) of Gaussian intensity matrixes, which are not limitative of the present invention.

The recognition method of the present invention is executed to calculate the light compensation coefficients in each color channel by the equations which are $$\text{Max}(\mu_R, \mu_G, \mu_B) = m,$$

$$\kappa_R = \left(\frac{m}{\mu_R}\right) * \frac{\text{Max}(\sum_{G(\mu=0.5,\sigma=1)})}{\text{Max}(\sum_R)},$$

$$\kappa_G = \left(\frac{m}{\mu_G}\right) * \frac{\text{Max}(\sum_{G(\mu=0.5,\sigma=1)})}{\text{Max}(\sum_G)},$$

$$\kappa_B = \left(\frac{m}{\mu_B}\right) * \frac{\text{Max}(\sum_{G(\mu=0.5,\sigma=1)})}{\text{Max}(\sum_B)},$$

wherein $\kappa_R$, $\kappa_G$ and $\kappa_B$ are light compensation coefficients of R, G, B color channels, and $\mu_R$, $\mu_G$ and $\mu_B$ are average color values of R, G, B color channels. A maximum of the $\Sigma_G$ singular value decomposition of Gaussian noise image ($\mu=0.5$, $\sigma=1$) is selected as a reference image without light pollution.

After the recognition method of the present invention is executed to completely compensate the image A by the light compensation coefficients, the light-compensated image (rebuilt image) is obtained. The SVD matrix of the light-compensated image is $$\Xi_{AC} = U_A(\kappa_A \Sigma_A) V_A^T,$$

wherein $\Xi_{AC}$ is the light-compensated image (rebuilt image).

In a preferred embodiment, the recognition method of the present invention utilizes a color space transformation equation which is $$\mu_{SACST} = \Xi_{RC} \bullet \Xi_{GC}^T \bullet \Xi_{BC},$$

wherein $\Xi_{SACST} \in \mathfrak{R}^{m \times n}$ is an image transformed by SACST, $\Xi_{RC}$, $\Xi_{GC}$ and $\Xi_{BC}$ are RGB color channels after adaptive light compensation, and ● is a symbol of dot product. The dot product of calculation is a method called projection color space transformation (CST) applied to combine the color coefficients and to thereby obtain a CST component image. The adaptive light compensation is suitably applied to adjust the range of the RGB color channels, and the dot product of matrixes is further applied to combine the coefficients of color channels. Accordingly, the correlation between the color and image are considered to project the information to a high-dimension space. After the original image is transformed by SACST, the inseparable information of the image can be linearly separated on a hyper-plane by hyper dimension. Consequently, the correlation and differences of the information the component image are generated for recognition.

Figure 3:
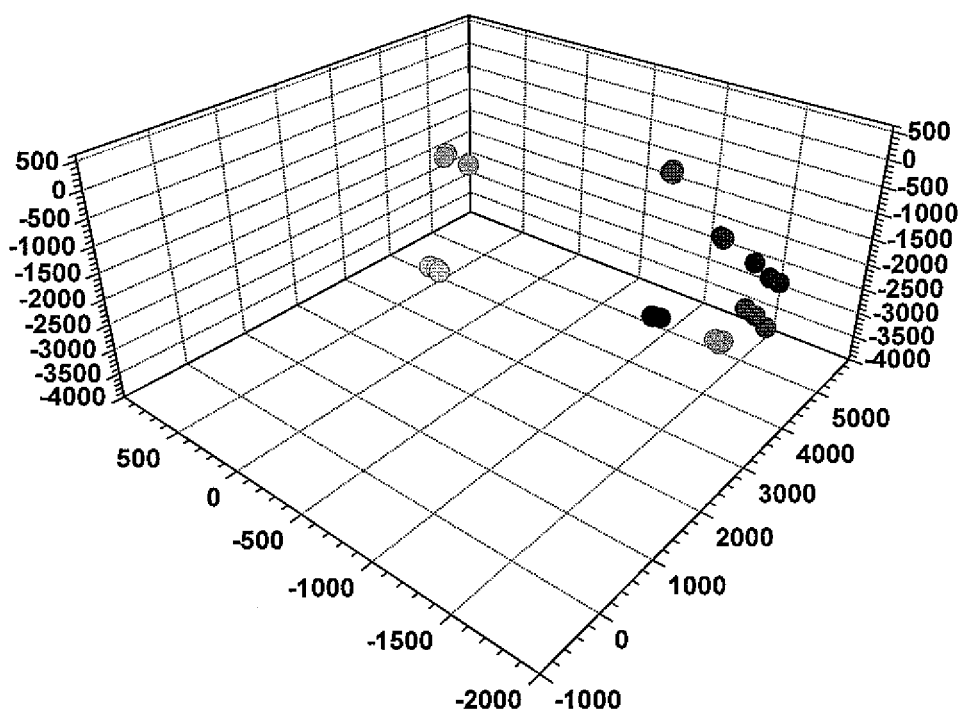
FIG. 3 is a schematic diagram of clustered image data distributed in a RGB color space processed by the recognition method and system for component images in accordance with the preferred embodiment of the present invention.

FIG. 3 shows a schematic diagram of clustered image data distributed in a RGB color space processed by the recognition method and system for component images in accordance with the preferred embodiment of the present invention. Referring to FIG. 3, for example, the correlation and differences of the information the component image are shown by set dot points which are not limitative of the present invention.

The recognition method of the present invention will be further executed on the output unit which may be selected from various monitoring devices, printing devices or other equivalent data-outputting devices. In a preferred embodiment, the output unit further connects to an alarm system or other related devices. Advantageously, the recognition method of the present invention utilizes the CST or SACST transformed data of the component image to recognize or inspect at least one component which is not limitative of the present invention.

Although the invention has been described in detail with reference to its presently preferred embodiments, it will be understood by one of ordinary skill in the art that various modifications can be made without departing from the spirit and the scope of the invention, as set forth in the appended claims.

What is claimed is:

1. A recognition method comprising:
   retrieving at least one image of an electronic component from an image source, with the at least one image having pixel values of color channels;
   searching at least one difference among the color channels of the at least one image;
   utilizing a singular value decomposition (SVD) method to process the at least one image to obtain a SVD matrix, wherein the SVD matrix is calculated using the at least one difference;
   applying a color space transformation (CST) method to execute calculation on each color channel, wherein the CST method comprises combining color coefficients by computing a product of the SVD matrix of each of the color channels to obtain a CST image; and
   projecting the CST image to a high-dimension space for generating correlation and differences of information of the at least one image; and
   recognizing at least one electronic component from the projected CST image.

2. The recognition method as defined in claim 1, further comprising utilizing a light compensation method to calculate at least one light compensation coefficient utilized to process the at least one image, to thereby obtain a light-compensated image.

3. The recognition method as defined in claim 2, further comprising:
   calculating an average pixel value of the RGB color channels to search each ratio between differences of RGB pixel values of the color channels of the at least one image; and
   adding each ratio between the differences of RGB pixel values of the color channels to the light-compensated image to restore the loss information due to decomposition and light compensation.

4. The recognition method as defined in claim 2, further comprising adding each ratio between differences of RGB pixel values of the color channels to the light-compensated image to restore the loss information due to decomposition and light 5. The recognition method as defined in claim 1, wherein the at least one image is decomposed in a color space.

6. The recognition method as defined in claim 5, wherein the color space includes a plurality of the color channels on each of which the at least one image is processed by the SVD method.

7. The recognition method as defined in claim 5, wherein the color space is selected from a RGB color space which includes a red channel, a green channel and a blue channel on each of which the at least one image is processed by the SVD method.

8. The recognition method as defined in claim 7, wherein when the at least one image is decomposed in the RGB color space, at least one light compensation coefficient for the red channel, the green channel and the blue channel is calculated.

9. The recognition method as defined in claim 8, further comprising calculating an average pixel value of the color channels of the at least one image, thereby adaptively adjusting each of the at least one light compensation coefficient.

10. A recognition system for component images, comprising:
an input device retrieving at least one image of an electronic component from an image source, with the at least one image having pixel values of color channels;
a computing device connected to the input device, provided with functions of:
searching at least one difference among the color channels of the at least one image;
utilizing a singular value decomposition (SVD) method to process the at least one image to obtain a SVD matrix, wherein the SVD matrix is calculated using the at least one difference,
wherein a color space transformation (CST) method is applied to execute calculation on each color channel, wherein the CST method comprises combining color coefficients by computing a product of the SVD matrix of each of the color channels to obtain a CST image which is further projected to a high-dimension space for generating correlation and differences of information of the at least one image; and
recognizing at least one electronic component from the projected CST image.

11. The recognition system as defined in claim 10, wherein a light compensation method is utilized to calculate at least one light compensation coefficient utilized to process the at least one image, to thereby obtain a light-compensated image.

12. The recognition system as defined in claim 11, wherein the at least one image is decomposed in a color space.

13. The recognition system as defined in claim 12, wherein the color space includes a plurality of the color channels on each of which the at least one image is processed by the singular value decomposition.

14. The recognition system as defined in claim 12, wherein the color space is selected from a RGB color space which includes a red channel, a green channel and a blue channel on each of which the at least one image is processed by the singular value decomposition.

15. The recognition system as defined in claim 14, wherein when the at least one image is decomposed in the RGB color space, at least one light compensation coefficient for the red channel, the green channel and the blue channel is calculated.

16. The recognition system as defined in claim 15, wherein an average pixel value of the color channels of the at least one image is calculated, thereby adaptively adjusting each of the at least one light compensation coefficient.

17. The recognition system as defined in claim 14, wherein an average pixel value of the RGB color channels is calculated to search each ratio between differences of RGB pixel values of the color channels of the at least one image and each ratio between the differences of RGB pixel values of the color channels are further added to the light-compensated image to restore the loss information due to decomposition.

18. The recognition system as defined in claim 11, wherein each ratio between the differences of RGB pixel values of the color channels are added to restore the loss information due to decomposition and light compensation, to the light-compensated image.

* * * * *